Feb. 12, 1952     R. B. COTTON     2,585,442
HYDRODYNAMIC TESTING APPARATUS
Filed Feb. 5, 1951     2 SHEETS—SHEET 2
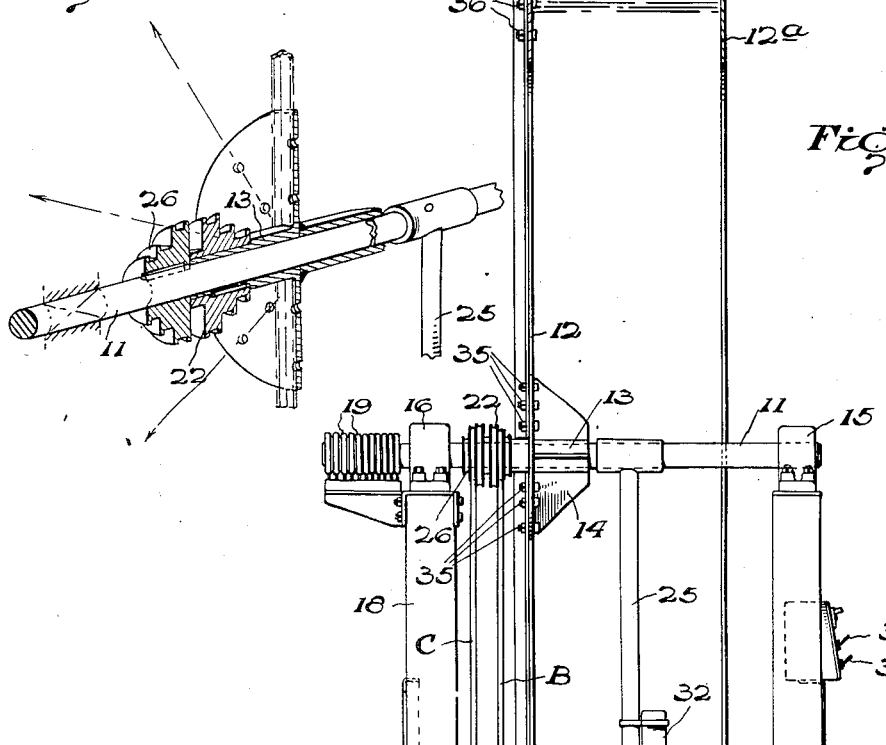
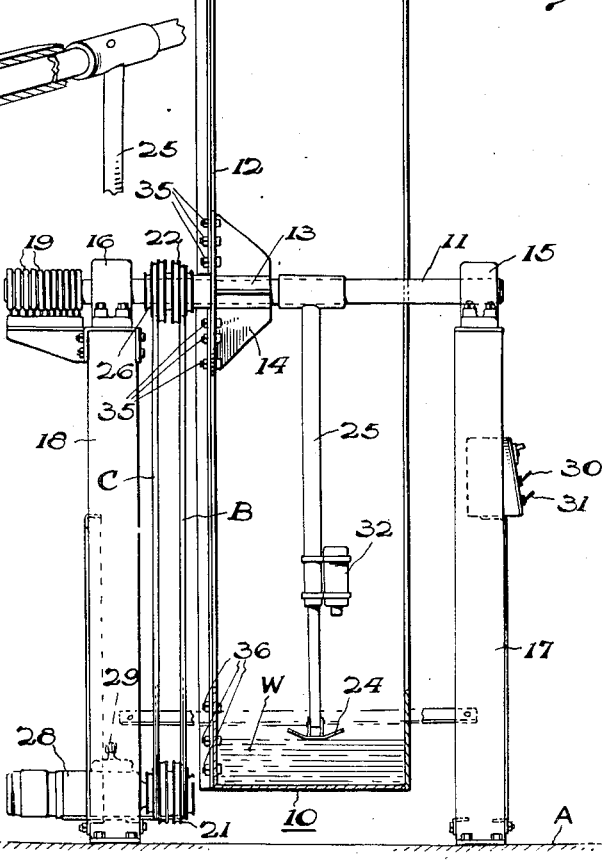
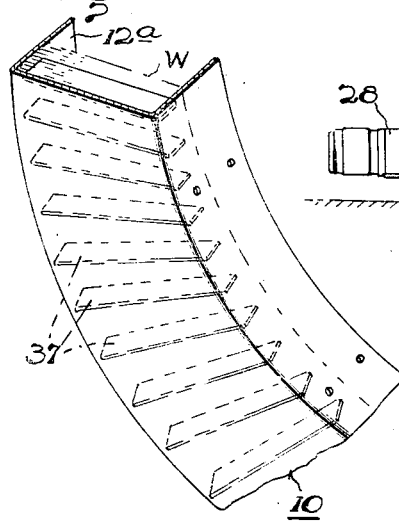
INVENTOR
Robert B. Cotton.
BY Herbert M. Birch
ATTORNEY

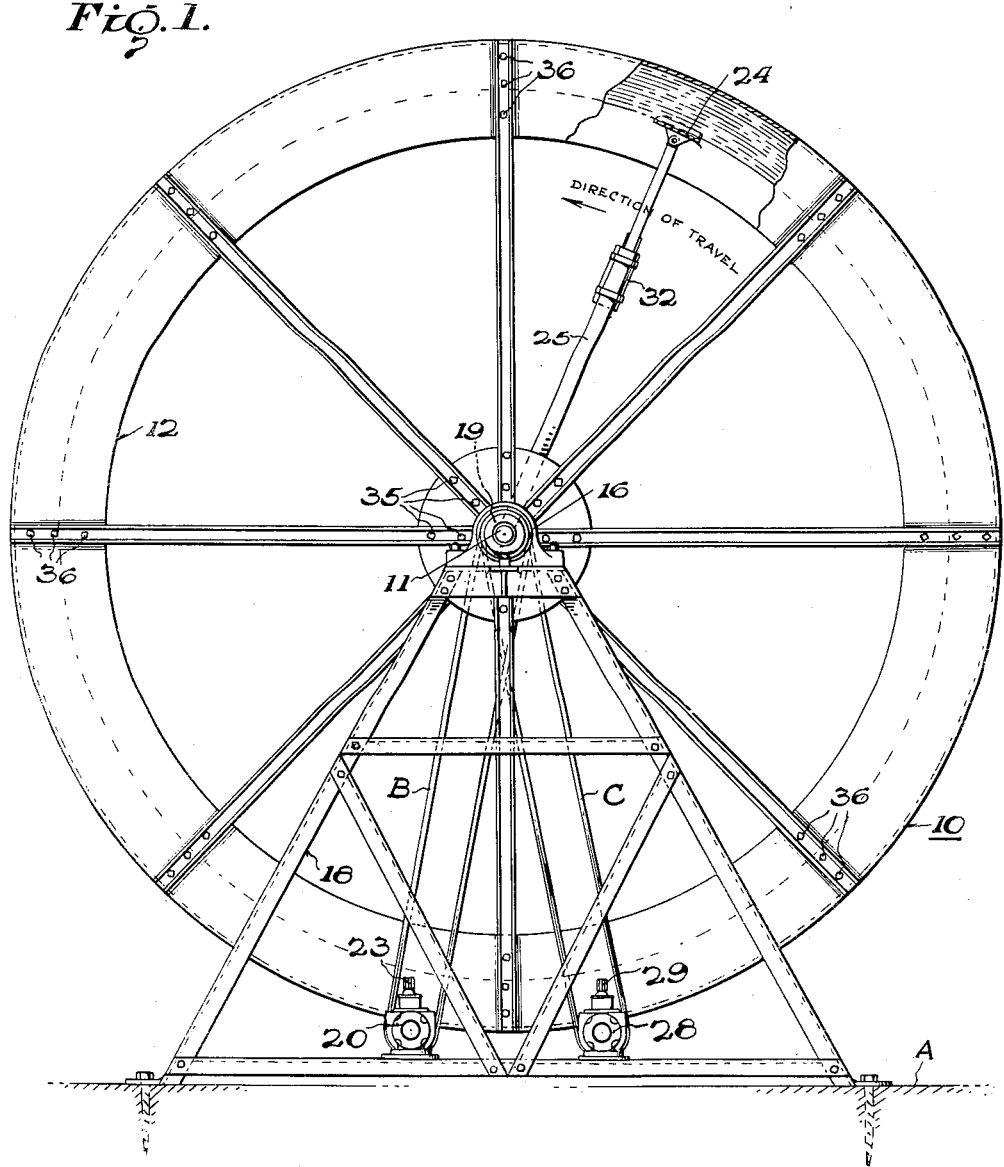

UNITED STATES PATENT OFFICE 2,585,442

HYDRODYNAMIC TESTING APPARATUS

Robert B. Cotton, Media, Pa., assignor to All American Airways, Inc., Wilmington, Del., a corporation of Delaware Application February 5, 1951, Serial No. 209,402

5 Claims. (Cl. 73—148)

The present invention relates to improvements in hydrodynamic testing apparatus and more particularly to water basins for investigating the hydrodynamic performance of models of water based vehicles, such as boat hulls, planing surfaces, aircraft floats, aircraft hulls and the like.

An object of this invention is to provide a test tank for developing a continuous smooth water surface of various known water velocities and constant depth within the tank.

A further object is to provide a device having the ability to vary Froude's scale factor by simulating the variation of the factor "g" which is an important factor included in the Froude's scale factor $$\frac{V}{\sqrt{Lg}}$$

where
V=velocity
L=characteristic length of body
g=acceleration of gravity used in hydrodynamic investigations.

This is accomplished by varying the centripetal acceleration by changing speed of rotation.

Still a further object is to provide a vertically rotating test tank with a stationary model carriage in lieu of the usual long stationary tanks with a movable model carriage heretofore used.

Yet another object is to provide means for turning and means for adjusting the model arm with respect to the water surface in the interior of the drum.

With these and other objects in view, the invention consists in the construction, arrangement and combination of parts hereinafter described and particularly pointed out in the claims.

In the drawings like parts throughout the several views are given like numerals and are thus identified in the following detailed description:

Figure 1 is a rear side view of the present invention showing the test drum, its mountings and drive means.

Figure 2 is a cross section view taken parallel to the drum axle with the model arm in elevation.

Figure 3 is a partial view of the drum axle, tank drive and model arm drive and connections.

Figure 4 is a modification of the interior surface of the test drum.

Referring to the drawings, there is shown in Figures 1 and 2, an annular tank or drum 10 mounted for rotation vertically on a horizontal axis or axle 11. The tank or drum is formed on one side with a centrally apertured wall 12 and is open on its opposite side except for annular flange 12ª. Secured to the interior face of wall 12 around the central aperture is a bushing or sleeve 13 formed with bracing ribs 14. The axle 11 is mounted in bearings 15 and 16 and extends through the sleeve 13 across the interior of the tank or drum 10 for rotation in the bearings on the top of vertical triangular supporting frames 17 and 18 respectively, anchored to a solid base A.

The axle 11 projects beyond bearing 16 sufficiently far to support a plurality of slip rings 19 for instrumentation of the model being tested in the drum. For example, suitable balances, not shown, may be incorporated into the model support, about to be described, to measure drag, lift, stability and the like at various water velocities. The velocity of fluid within the drum 10 is a direct function of the R. P. M. at which the drum is being driven.

The drum is driven at various speeds by means such as an electric motor 20 and a belt and pulley drive B. This drive includes a drive pulley 21 in the motor shaft and a driven pulley 22 keyed to the drum sleeve 13, in Figures 2 and 3. Various speeds of pulley rotation are possible because of the provision of any well known form of variable speed drive shiftable by means of lever 23. Thus the velocity of the water W in the drum may be controlled accurately for making various test conditions with respect to a model 24 pivotally attached to a model test arm 25 keyed by a pin 26 to the axle 11, as shown in Figures 2 and 3.

A driven pulley 26 is keyed to axle 11, see Figure 3. A drive belt C from a drive pulley 27 is looped around driven pulley 26 and a motor 28 and variable transmission shift lever 29 similar to motor 20 and lever 23 are provided to permit driving of the model arm, if desired. Usually during tests the model arm is fixed and only the drum 10 is driven or revolved.

The electric circuits to the motors 20 and 28 are not shown, but it is understood that the switches 30 and 31 on the control panel shown in Figure 2 are connected in parallel to said motors for their selective operation.

The model arm 25 is made in two telescoping sections so that the model 24 may be adjusted to and from the water surface in the drum 10. Also, a camera 32 may sometimes be mounted on the arm for taking action pictures of the model and water motion during a test.

The drum 10 preferably has its rear wall 12 strongly reinforced by a plurality of radially extending brace bars or spokes 33 secured to a circular disc 34 at the center of the wall by rivets 35 or the like and at their outer ends to the face of the wall near its circumference by rivets 36, see Figure 1.

Figure 4 shows a slight modification of the interior of the drum surface by the addition of transverse baffles or ribs 37. This may be found desirable to assist in maintaining the fluid velocity.

From the foregoing the operation of the device is believed obvious to those skilled in the art. For example, once the model to be tested is properly positioned it is held stationary and the drum 10 partially filled with water or other fluid is rotated at predetermined speeds.

When the centrifugal force of the water exceeds the force of gravity, the water forms a consistent depth and a smooth surface around the inside of he drum circumference. The model or hull can then be adjusted to the water surface at the top or bottom of the drum.

The water or fluid is held to the interior surface of the drum by centrifugal force and is driven by the friction of fluid in the surface of the drum. Thus the water velocity is obviously a direct function of the R. P. M. at which the drum is being driven.

Although only two embodiments of the invention have been illustrated and described in detail, it is to be expressly understood that the invention is not limited thereto. Various changes may be made in the combination and arrangement of the parts without departing from the spirit and scope of the invention, as will now likely occur to others skilled in the art. For a definition of the limits of the invention, reference should be had to the appended claims.

What I claim is:

1. In apparatus for testing the performance of a body relative to the velocity of a liquid surface, in combination, a vertically rotating drum adapted to receive a quantity of liquid, a horizontal axle for said drum on which said drum is journalled for rotation, whereby a velocity of movement of the liquid proportional to the R. P. M. of said drum is attained, variable power drive means for rotating said drum at various revolutions per minute, body supporting means connected to said axle enclosed within said drum, said means being adjustable with respect to the liquid surface, and instrument take-off means on said axle for measuring the performance of the body relative to the liquid surface.

2. In apparatus for testing the performance of a body relative to the velocity of a liquid surface, in combination, a vertically rotating drum adapted to receive a quantity of liquid, a horizontal axle for said drum on which said drum is journalled for rotation, whereby a velocity of movement of the liquid proportional to the R. P. M. of said drum is attained, variable power drive means for rotating said drum at various revolutions per minute, body supporting means connected to said axle enclosed within said drum, said means being adjustable with respect to the liquid surface, and a camera mounted on the said supporting means adapted to take a picture of the body's action in the liquid at predetermined velocities of the liquid.

3. In apparatus for testing the performance of a body relative to the velocity of a liquid surface, in combination, a vertically rotating drum adapted to receive a quantity of liquid, a horizontal axle for said drum on which said drum is journalled for rotation, whereby a velocity of movement of the liquid proportional to the R. P. M. of said drum is attained, variable power drive means for rotating said drum at various revolutions per minute, body supporting means connected to said axle enclosed within said drum, said means being adjustable with respect to the liquid surface, and instrument take-off means on said axle for measuring the performance of the body relative to the liquid surface, said drum's interior surface having baffles formed therein adapted to increase the liquid friction with the said drum's surface.

4. In apparatus for testing the performance of a body relative to the velocity of a liquid surface, in combination, a vertically rotating drum adapted to receive a quantity of liquid, a horizontal axle for said drum on which said drum is journalled for rotation, whereby a velocity of movement of the liquid proportional to the R. P. M. of said drum is attained, variable power drive means for rotating said drum at various revolutions per minute, body supporting means connected to said axle enclosed within said drum, said means being adjustable with respect to the liquid surface, second variable power drive means for said body supporting means, switch means for selectively operating said first and second drive means, and a plurality of slip rings on said axle for instrumentation of the actions of the body relative to the velocity of the liquid in the drum.

5. In apparatus for testing boats, hulls and the like, in combination a vertical drum partially filled with water and rotatable on a horizontal axle, said axle being supported between spaced standards, means for rotating said drum at high speeds, thereby uniformly holding the water to the rim of the drum by centrifugal force, a model holder for supporting a model stationary with respect to the moving drum and moving surface of the water, and means on said axle for taking off measurements of drag, resistance and the like of the model with respect to the liquid velocity.

ROBERT B. COTTON.

REFERENCES CITED

The following references are of record in the file of this patent:

UNITED STATES PATENTS

| Number | Name | Date |
|---|---|---|
| 1,953,045 | Procofieff-Seversky | Mar. 27, 1934 |